United States Patent
Kelly et al.

(10) Patent No.: US 11,736,348 B2
(45) Date of Patent: Aug. 22, 2023

(54) SYSTEM AND METHOD FOR NETWORK SERVICES BASED FUNCTIONALITY PROVISIONING IN A VDI ENVIRONMENT

(71) Applicant: Dell Products L.P., Round Rock, TX (US)

(72) Inventors: John Kelly, Mallow (IE); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 17/360,196

(22) Filed: Jun. 28, 2021

(65) Prior Publication Data

US 2022/0417094 A1 Dec. 29, 2022

(51) Int. Cl.
*H04L 12/911* (2013.01)
*G06F 9/455* (2018.01)
(Continued)

(52) U.S. Cl.
CPC ...... *H04L 41/0816* (2013.01); *G06F 9/45558* (2013.01); *H04L 41/5022* (2013.01);
(Continued)

(58) Field of Classification Search
CPC ............ H04L 41/0816; H04L 41/5022; H04L 43/0888; H04L 63/0236; G06F 9/45558; G06F 2009/45595
(Continued)

(56) References Cited

U.S. PATENT DOCUMENTS 6,463,470 B1 * 10/2002 Mohaban ............ H04L 47/2408
                                                 709/224
7,417,953 B2 * 8/2008 Hicks .................. H04L 41/0816
                                                 370/252
(Continued)

FOREIGN PATENT DOCUMENTS

AU      2013318249 B2    4/2016
EP        3111592 B1     4/2021
(Continued)

OTHER PUBLICATIONS

Giurgiu, Ioana, et al. "Enabling Efficient Placement of Virtual Infrastructures in the Cloud", ACM/FIP/USENIX International Conference on Distributed Systems Platforms and Open Distributed Processing. Springer, Berlin, Heidelberg, 2012 (Year 2012).
(Continued)

*Primary Examiner* — Kevin T Bates
*Assistant Examiner* — Golam Mahmud
(74) *Attorney, Agent, or Firm* — Chamberlain, Hrdlicka, White, Williams & Aughtry

(57) ABSTRACT

A service manager for managing services made available to front end devices operably connected to backend devices via managed network devices includes a storage device for storing a services network use information repository that associates the services with network functions enabled by the managed network devices and a processor. The processor makes an identification of a front end device of the front end devices that will provide virtualized desktop infrastructure services, using at least one of the backend devices, to a user; in response to the identification: identifies a set of the services to be provided to the user; identifies: at least one of the managed network devices that provides network connectivity to the front end device, and network use information for the set of services using the services network use information repository; and configures the at least one
(Continued)

managed network device based on the network use information.

19 Claims, 11 Drawing Sheets

(51) Int. Cl.

| | | |
|---|---|---|
| G06F 9/48 | (2006.01) | |
| G06F 9/445 | (2018.01) | |
| H04L 9/06 | (2006.01) | |
| G06F 15/173 | (2006.01) | |
| H04L 41/0816 | (2022.01) | |
| H04L 43/0888 | (2022.01) | |
| H04L 9/40 | (2022.01) | |
| H04L 41/5022 | (2022.01) | |

(52) U.S. Cl.
CPC ...... *H04L 43/0888* (2013.01); *H04L 63/0236* (2013.01); *G06F 2009/45595* (2013.01)

(58) Field of Classification Search
USPC .......................................................... 709/224
See application file for complete search history.

(56) References Cited

U.S. PATENT DOCUMENTS

| | | | |
|---|---|---|---|
| 7,694,104 B2* | 4/2010 | Honda ................ G06F 3/0689 | 711/202 |
| 8,087,025 B1 | 12/2011 | Graupner | |
| 8,286,165 B2 | 10/2012 | Miyata et al. | |
| 8,392,928 B1 | 3/2013 | Forys et al. | |
| 8,868,749 B2 | 10/2014 | Bartfai-walcott et al. | |
| 8,972,537 B2* | 3/2015 | Bastian ................ H04L 45/306 | 709/240 |
| 9,083,608 B2 | 7/2015 | Heninger et al. | |
| 9,210,100 B2* | 12/2015 | Van Der Linden ....................... H04L 67/1097 | |
| 9,384,061 B1 | 7/2016 | Deivanayagam et al. | |
| 9,590,916 B2* | 3/2017 | Ashokan ............ H04L 67/306 | |
| 9,727,110 B2* | 8/2017 | Hamdi ................ G06F 1/3203 | |
| 9,760,429 B2 | 9/2017 | Anderson et al. | |
| 10,542,078 B1* | 1/2020 | Farrugia ............ G06F 16/90 | |
| 10,552,221 B2 | 2/2020 | Olshefski et al. | |
| 10,671,953 B1 | 6/2020 | Xu et al. | |
| 10,853,148 B1 | 12/2020 | Kenney et al. | |
| 11,385,924 B1* | 7/2022 | Hwang ............ G06F 9/45558 | |
| 2004/0103261 A1* | 5/2004 | Honda ................ G06F 3/0665 | 711/202 |
| 2008/0031436 A1* | 2/2008 | Der ...................... H04M 7/006 | 379/201.02 |
| 2012/0167044 A1* | 6/2012 | Fortier ................ G06F 9/45529 | 717/121 |
| 2012/0173708 A1 | 7/2012 | Bartfai-walcott et al. | |
| 2012/0185868 A1 | 7/2012 | Bartfai-walcott et al. | |
| 2014/0278623 A1 | 9/2014 | Martinez et al. | |
| 2015/0172205 A1 | 6/2015 | Anderson et al. | |
| 2015/0212847 A1* | 7/2015 | Sok .......................... G06F 12/10 | 711/129 |
| 2016/0217010 A1 | 7/2016 | Krishnan et al. | |
| 2016/0269239 A1 | 9/2016 | Ashby, Jr. et al. | |
| 2016/0328273 A1 | 11/2016 | Molka et al. | |
| 2017/0026473 A1* | 1/2017 | Dersy ................. H04L 12/4641 | |
| 2017/0237710 A1* | 8/2017 | Mayya .................... H04L 67/01 | 726/13 |
| 2017/0264493 A1 | 9/2017 | Cencini et al. | |
| 2018/0039524 A1 | 2/2018 | Dettori et al. | |
| 2018/0046476 A1 | 2/2018 | Baughman et al. | |
| 2018/0129503 A1 | 5/2018 | Narayan et al. | |
| 2018/0241811 A1 | 8/2018 | Chen et al. | |
| 2020/0014609 A1 | 1/2020 | Hockett et al. | |
| 2020/0310847 A1 | 10/2020 | Schulze et al. | |
| 2020/0341794 A1 | 10/2020 | Martin | |

FOREIGN PATENT DOCUMENTS

| | | |
|---|---|---|
| WO | 2015130645 A1 | 9/2015 |
| WO | 2017052910 A1 | 3/2017 |
| WO | 2019226609 A1 | 11/2019 |
| WO | 2021226344 A1 | 11/2021 |

OTHER PUBLICATIONS

Karnagel, Tomas, Dirk Habich, and Wolfgang Lehner. "Adaptive Work Placement for Query Processing on Heterogeneous Computing Resources", Proceedings of the VLDB Endowment 10.7 (2017): 733-744. (Year: 2017).

Moschakis, Ioannis A., and Helen D. Karatza. "Evaluation of gang scheduling performance and cost in a cloud computing system". The journal of supercomputing 59.2 (2012): 975-992. (Year: 2012).

Tirado, Juan M., et al. "Predictive Data Grouping and Placement for Cloud-ased Elastic Server Infrastructures", 2011 11th IEEE/ACM International Symposium on Cluster, Cloud and Grid Computing. IEEE, 2011. (Year: 2011).

Cheng et al., "Heterogeneity-aware Workload Placement and Migration in Distributed Sustainable Datacenters", 2014 IEEE 28th International Parallel & Distributed Processing Symposium, IEEE (Year: 2014).

Gmach, et al, "Resource and Virtualization Costs up in the Cloud: Models and Design Choices", 2011 IEEE/IFIP 41st International Conference on Dependable Systems & Networks (DSN), IEEE (Year: 2011).

* cited by examiner

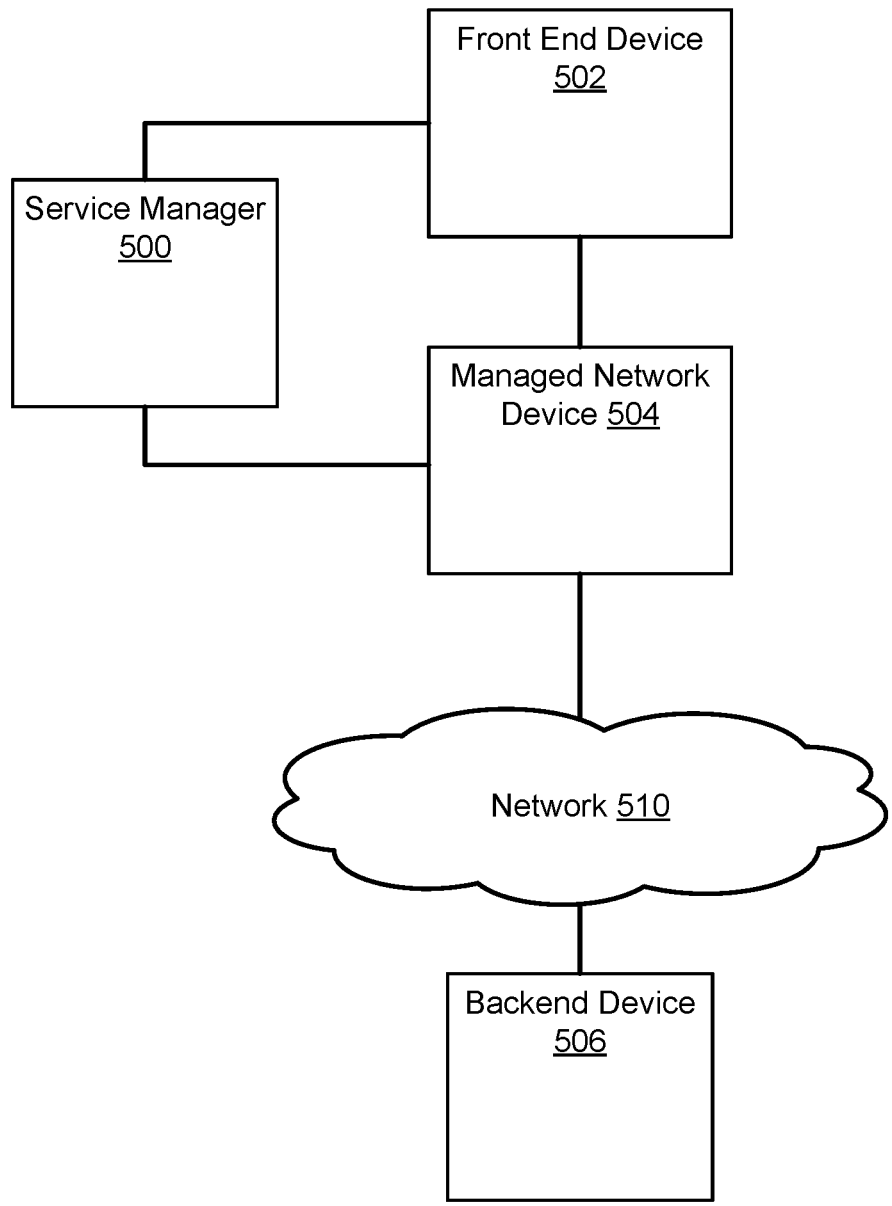
FIG. 5.1

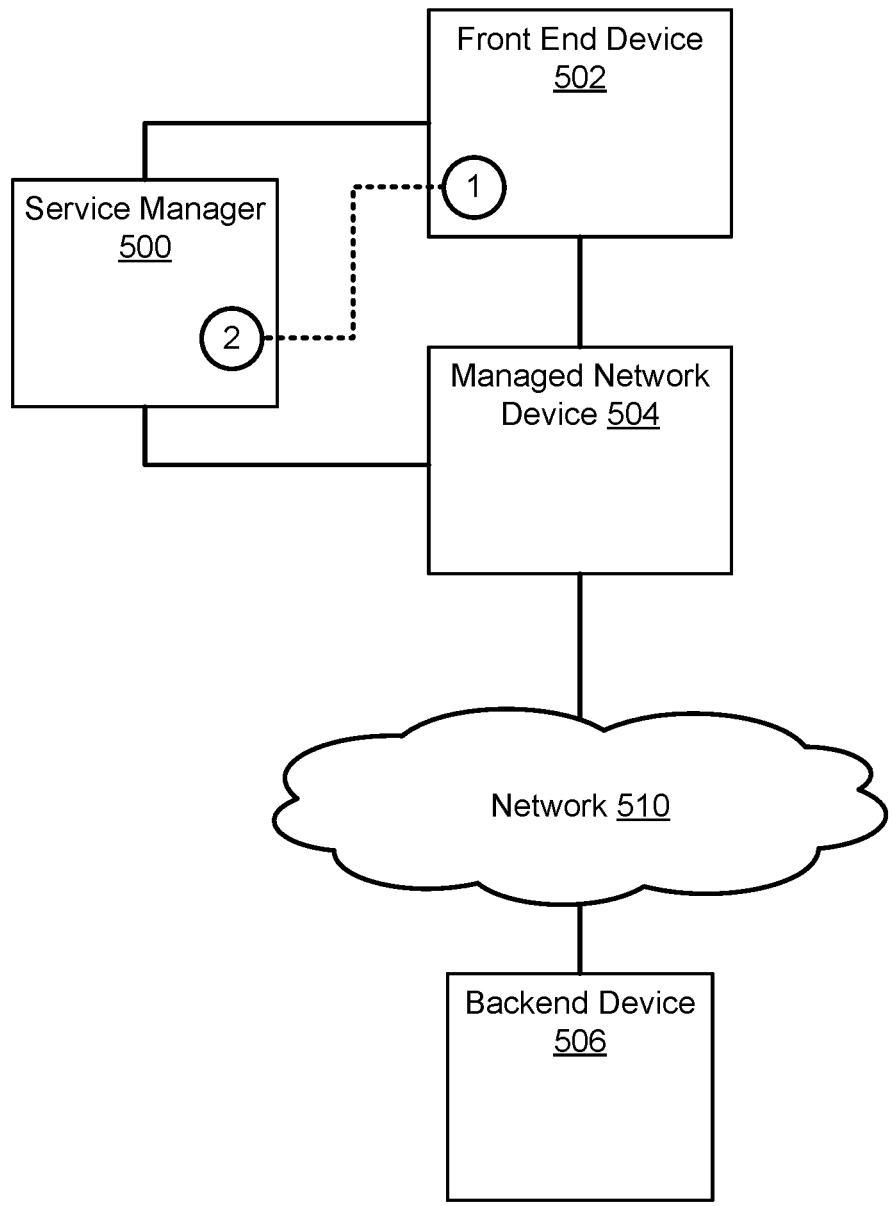
FIG. 5.2

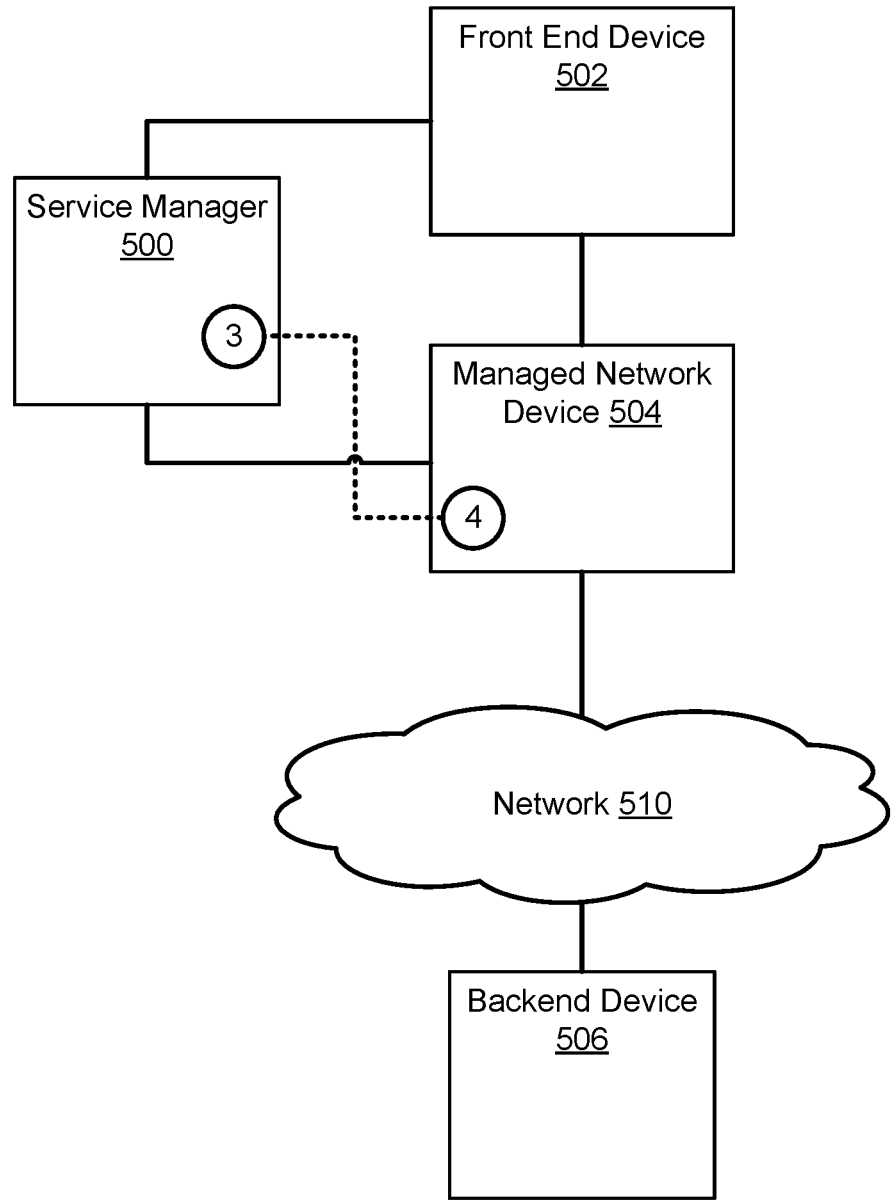
FIG. 5.3

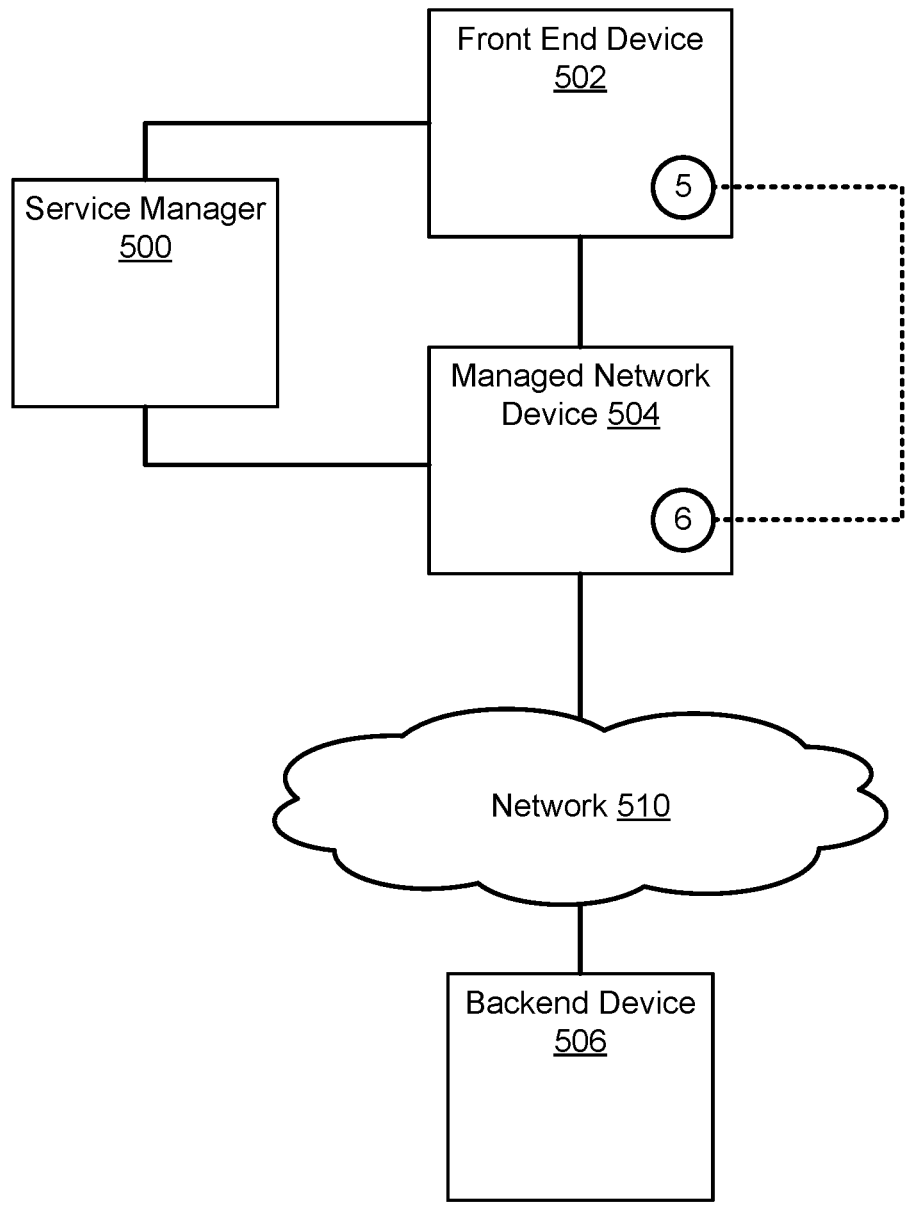
FIG. 5.4

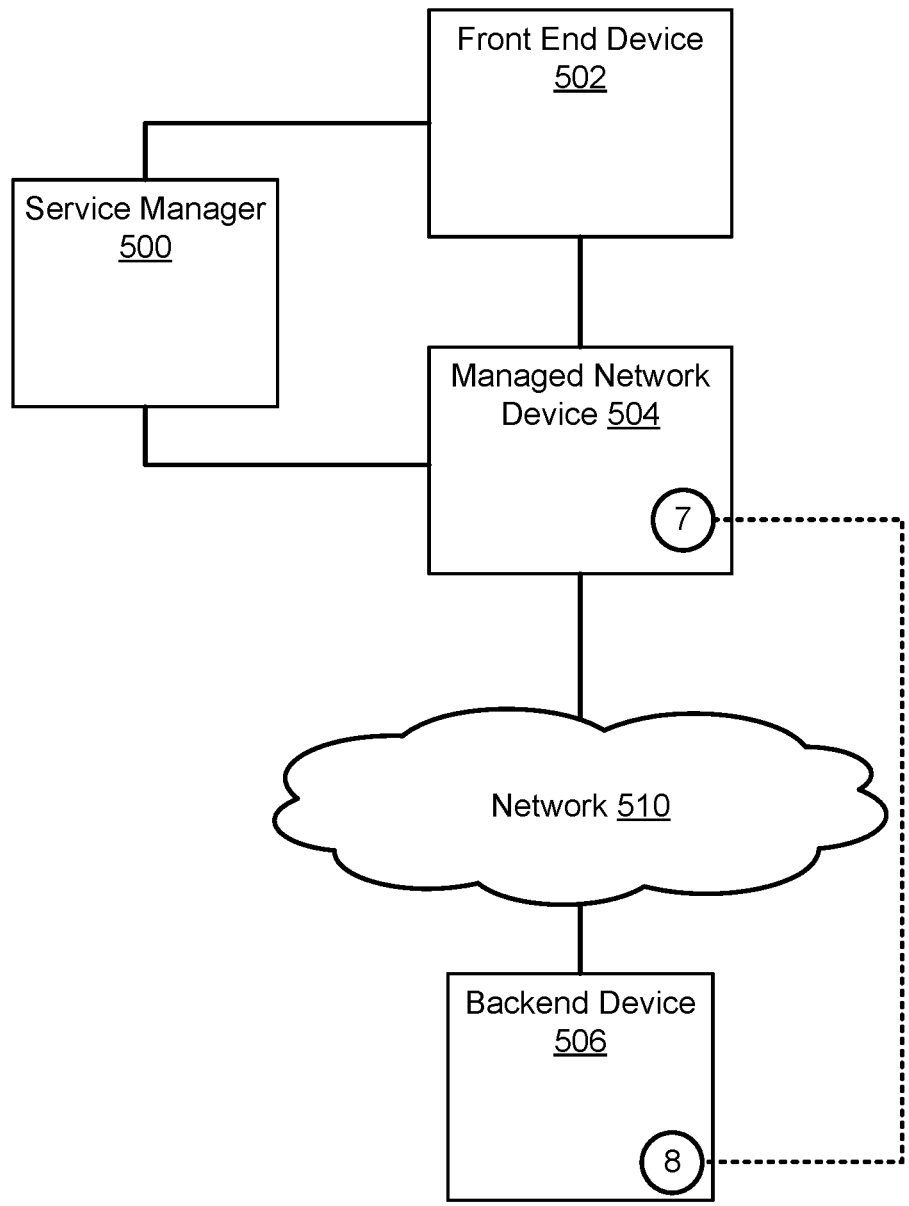
FIG. 5.5

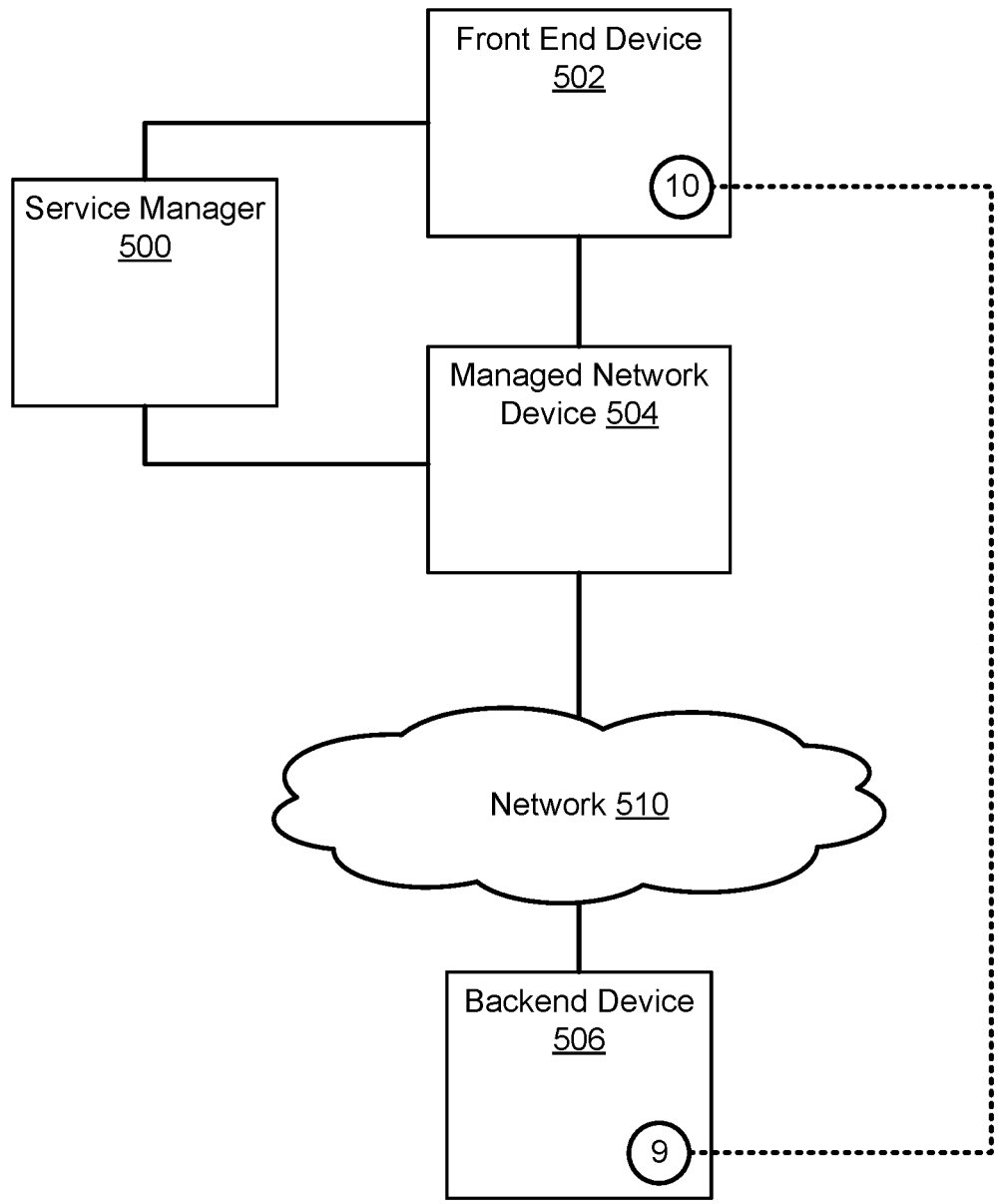
FIG. 5.6

SYSTEM AND METHOD FOR NETWORK SERVICES BASED FUNCTIONALITY PROVISIONING IN A VDI ENVIRONMENT

BACKGROUND

Computing devices may provide services. To provide the services, the computing devices may include hardware components and software components. The software components may store information usable to provide the services using the hardware components.

SUMMARY

In one aspect, a service manager for managing services made available to front end devices operably connected to backend devices via managed network devices in accordance with one or more embodiments of the invention includes a storage device for storing a services network use information repository that associates the services with network functions enabled by the managed network devices and a processor. The processor makes an identification of a front end device of the front end devices that will provide virtualized desktop infrastructure (VDI) services, using at least one of the backend devices, to a user; in response to the identification: identifies a set of the services to be provided to the user; identifies: at least one of the managed network devices that provides network connectivity to the front end device, and network use information for the set of services using the services network use information repository; and configures the at least one managed network device based on the network use information.

In one aspect, a method for managing services made available to front end devices operably connected to backend devices via managed network devices in accordance with one or more embodiments of the invention includes making an identification of a front end device of the front end devices that will provide virtualized desktop infrastructure (VDI) services, using at least one of the backend devices, to a user; in response to the identification: identifying a set of the services to be provided to the user; identifying: at least one of the managed network devices that provides network connectivity to the front end device, and network use information for the set of services using the services network use information repository that associates the services with network functions enabled by the managed network devices; and configuring the at least one managed network device based on the network use information.

In one aspect, a non-transitory computer readable medium in accordance with one or more embodiments of the invention includes computer readable program code, which when executed by a computer processor enables the computer processor to perform a method for managing services made available to front end devices operably connected to backend devices via managed network devices. The method includes making an identification of a front end device of the front end devices that will provide virtualized desktop infrastructure (VDI) services, using at least one of the backend devices, to a user; in response to the identification: identifying a set of the services to be provided to the user; identifying: at least one of the managed network devices that provides network connectivity to the front end device, and network use information for the set of services using the services network use information repository that associates the services with network functions enabled by the managed network devices; and configuring the at least one managed network device based on the network use information.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 5.1-5.6 show diagrams of the operation of a system similar to that of FIG. 1 over time in accordance with one or more embodiments of the invention.

DETAILED DESCRIPTION

Figure 1:
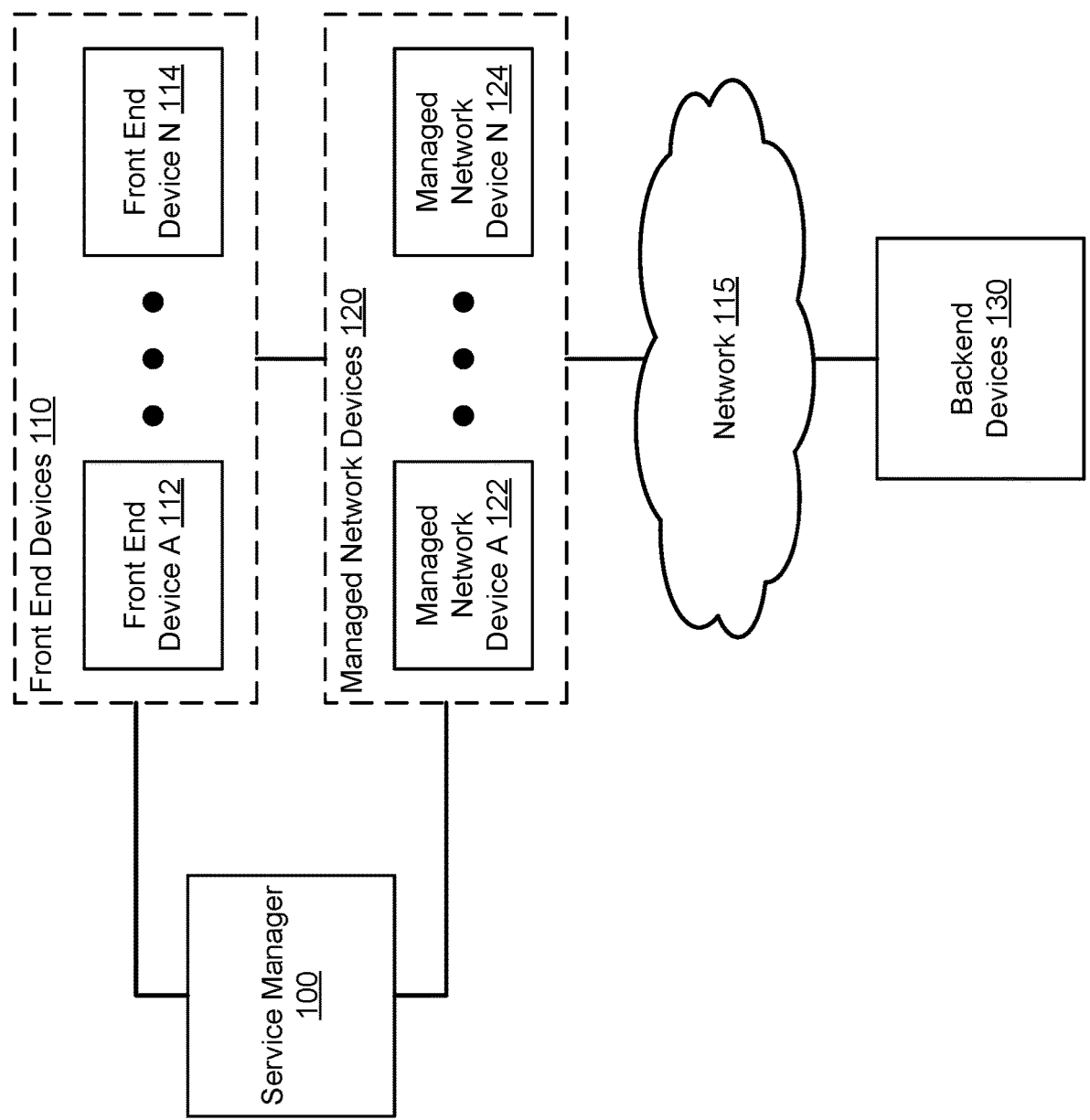
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

In general, embodiments of the invention relate to systems, devices, and methods for managing the services provided to users of front end devices. To provide services to the users, the front end devices may utilize, rely on, or otherwise cooperate with backend devices (which may be remote to the front end devices). For example, the front end devices may transmit information to the backend devices that allows the backend devices to perform computations, the results of which are used by the front end devices to provide services to the users. To do so, the front end devices may provide virtual desktop access capabilities that utilize other devices for providing a portion, or all, of the services to users of the front end devices.

The front end devices may be operably connected to the backend devices via a network environment. The network environment may allow the front end devices to communicate with the backend devices.

The front end devices may be capable of providing a range of services to the users of the front end devices. However, not all of the users may be allowed to receive all of the services.

To manage the services provided to the users of the front end devices, a system in accordance with embodiments of the invention may manage the operation of the network environment in which the front end and backend devices reside. Specifically, the system may limit communications of the front end devices within the network environment to those used to provide services which the users are allowed to receive. For example, the system may: disable or enable ports (e.g., TCP ports, UDP ports, etc.) over which communications corresponding to different services are transmitted via the network environment, may limit the rate at which communications from the front end devices and/or other actors are processed, and/or may otherwise modify the operation of the network environment in a manner that configures the services that may be provided to users of the front end devices (e.g., even while the front end devices may be otherwise able to provide more services to the users than those that the users are allowed to receive).

By doing so, computer implemented services provided to users of front end devices may be granularly configured without modifying the operation of the front end devices. Consequently, hardened front end devices that may be more resistant to attack, modification, etc. may be utilized. Additionally, the overhead for managing the services of the front end devices may be reduced by not requiring modification of the operation of the front end devices directly.

Further, the services that may be provided to users of the front end devices may be configured at an even more granular level than would be possible via direct modification of the front end devices. For example, virtualized desktop infrastructure may have predetermined levels of customization. Thus, it may not be possible to realize the level of configuration necessary to granularly tailor the services provided to users of the front end devices via modification of the front end devices themselves. In contrast, modification of a network environment to which the front end devices connect may provide for a greater level of granularity in customizing, configuring, tailoring, or otherwise providing services to users of the front end devices. To do so, the system may modify the operation of various ports (e.g., corresponding to communication protocols such as Transmission Control Protocol (TCP) and User Datagram Protocol (UDP) to prevent some services to be provided and/or limit the quality of the services (e.g., by limiting the rate at which communications used to provide the services are processed by a network environment).

By doing so, a system in accordance with embodiments of the invention may provide services to users of front end devices that correspond to different service levels (e.g., tiers), goals (e.g., corresponding to functions required for different roles), and may be different from those available even through customization of the virtual desktop infrastructure (or other computing environment) implemented by the front end devices.

Turning to FIG. 1, FIG. 1 shows a system in accordance with one or more embodiments of the invention. The system of FIG. 1 may provide computer implemented services to users. To provide the computer implemented services to the users, the system of FIG. 1 may perform some computations locally and other computations remotely from the users. By doing so, a user may utilize a range of different types of local computing devices with different quantities of computing resources (e.g., processing cycles, memory, storage, etc.) while still being afforded a consistent experience.

For example, by performing some computations remotely, the system of FIG. 1 may improve the likelihood that a user experience provided by a range of different local computing devices is maintained even when the different local computing devices have different quantities of computing resources.

To provide the aforementioned computer implemented services, the system of FIG. 1 may include any number of front end devices (110). The front end devices (110) may be utilized by users and may provide the user experience to the users. Different front end devices (110) may have different computational capabilities. For example, different front end devices (e.g., 112, 114) may have different numbers of processors, different quantities of memory and/or storage, etc.

To provide a consistent user experience, the front end devices (110) may implement virtualized desktop infrastructure (VDI) or other types of computing environments that enable remote resources (e.g., backend devices (130)) to provide services that appear to the user to be provided by the front end devices (110). For example, the front end devices (110) may collect user input, correlate the collected user input to functionalities of computer implemented services to be provided to the users, communicate with backend devices (130) that perform the computations necessary to provide the functionalities of the computer implemented services, and use the computations performed by the backend devices (130) to provide the computer implemented services in a manner that appears (to the user) to be performed locally to the user.

When providing the computer implemented services to the users, the front end devices (110) may communicate with the backend devices (130) via managed network devices and/or a network (115). The managed network devices (120) may be any type of network device (e.g., switches, routers, etc.) that enables computing devices to communicate with other computing devices in a network environment. The managed network devices (120) may be capable of: (i) performing any number and type of communications schemes (e.g., internet protocol communications, ethernet communications, etc.), (ii) being configured by other devices, and (iii) limiting communications on a granular level (e.g., on a per port level, on a per sending device level, etc.) via filtering or other methodology.

When the front end devices (110) communicate with the backend devices (130) via the managed network devices (120), the front end devices (110) may transmit data structures having a predetermined format in accordance with a communications protocol implemented by the front end devices (110), the managed network devices (120), the network (115), and/or the back end devices (130). When providing different types of computer implemented services, the front end devices (110) may communicate with the backend devices (130) using different ports. Consequently, different functionalities of the computer implemented services provided by the front end devices (110) may be dependent on being able to communicate with the backend devices (130) via different ports. If such communications are made inoperable, then the front end devices (110) may be prevented from providing functionalities of the computer implemented services corresponding to the respective ports.

In general, embodiments of the invention relate to systems, devices, and methods for managing the services provided to users of the front end devices (110). Specifically, embodiments of the invention may provide a method of managing the provided computer implemented services by limiting network communications in the system of FIG. 1 rather than modifying the manner in which VDIs (e.g., VDIs are typically hosted by backend devices and accessed by front end devices) or other computing environments hosted by the front end devices (110) operate. By doing so, a system in accordance with embodiments of the invention may allow for the dynamic control of the computer implemented services provided by the front end devices (110).

For example, when a VDI hosted by a front end device (e.g., 110), it may provide a range of different computer implemented services using the backend devices (130). To provide these services, the front end device may communicate with the backend devices (130). The front end device may send communications corresponding to these different services using different ports for traffic management purposes.

To manage the services provided by front end devices (110), the system may include a service manager (100). The service manager (100) may manage the services provided by the front end devices (110) by: (i) identifying the services the front end devices (110) are to provide (e.g., based on users using the front end devices), (ii) identifying the ports that the front end devices (110) use to provide the services, and (iii) managing network communications within the system of FIG. 1 to only allow each of the front end devices (110) to communicate using the ports corresponding to the identified services.

To manage the network communications within the system of FIG. 1, the service manager (100) may configure the managed network devices (120). For example, the service manager (100) may: (i) disable some of the ports of the managed network devices, (ii) enable other ports of the managed network devices (e.g., those ports corresponding to the services the front end devices (110) are to provide to corresponding users), and/or (iii) limit the communications bandwidth afforded to the front end devices (110) (e.g., to provide qualities of service afforded to the respective users).

Thus, while the front end devices (110) may be capable of performing any number of computer implemented services, they may be limited in providing any number of the computer implemented services by the managed network devices (120). For example, the managed network devices (120) may prevent the front end devices (110) from communicating with the backend devices (130) using certain ports (which are required for providing the computer implemented services that are being limited).

For example, consider a scenario in which one of the front end devices communicates with a backend devices for (i) graphics display purposes via a first port and (ii) instant messaging services via a second port. If a user of the service manager (100) is not to be provided with instant messaging services, the service manager (100) may configure a managed network device that provides the one front end device with network access services to prevent the one front end device from communicating via the second port. The configured managed network device may drop the packets (or other communication protocol compliant data structures) transmitted via the second port thereby preventing the one front end device from providing instant messaging services while still being able to provide graphics displays (e.g., because packets corresponding to these services are being transmitted via the first port which is enabled).

Figure 2:
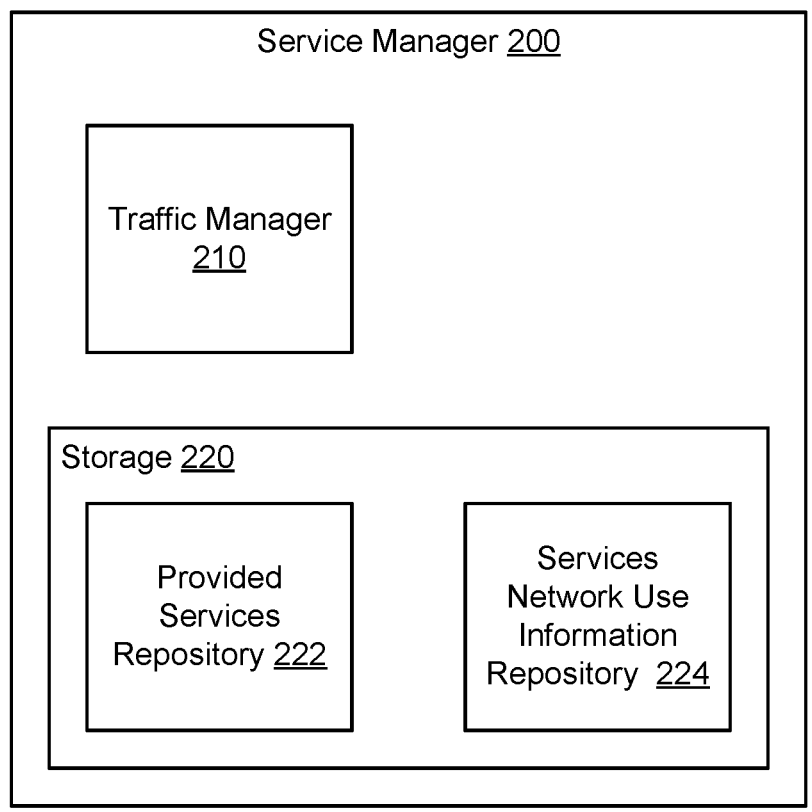
FIG. 2 shows a diagram of a service manager in accordance with one or more embodiments of the invention.

For additional details regarding the service manager (100), refer to FIG. 2.

The system of FIG. 1 may include any number of front end devices (110), managed network devices (120), back end devices (130), and service managers (e.g., 100). Any of the components of FIG. 1 may be operably connected to any other component and/or other components not illustrated in FIG. 1 via one or more networks (e.g., 115). The networks (e.g., 115) and/or managed network devices (120) may be implemented using any combination of wired and/or wireless network topologies. The networks and/or managed network devices (120) may employ any number and types of communication schemes to enable the front end devices (110), managed network devices (120), back end devices (130), and service managers (e.g., 100) to communicate with each other.

Figure 6:
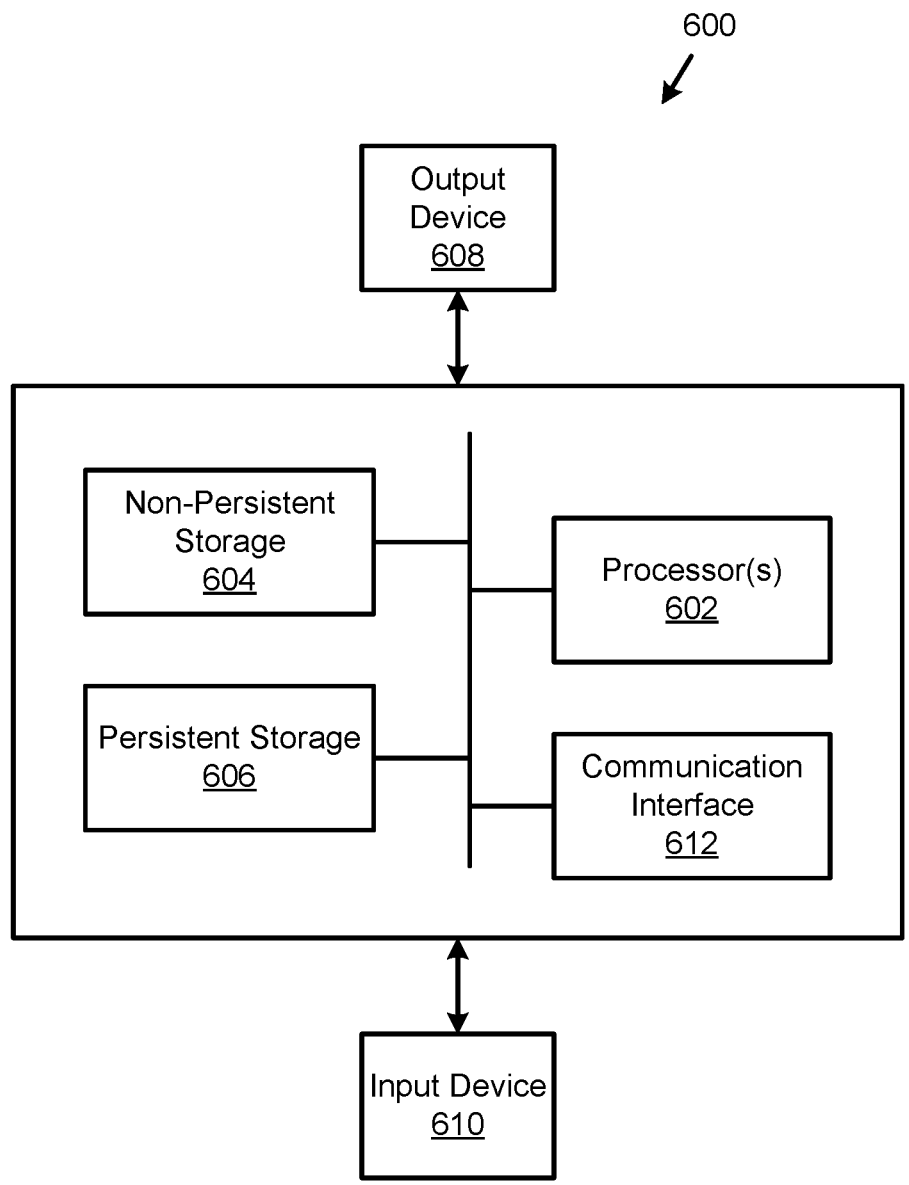
FIG. 6 shows a diagram of a computing device in accordance with one or more embodiments of the invention.

The front end devices (110), managed network devices (120), back end devices (130), and service managers (e.g., 100) may be implemented using computing devices. The computing devices may include, for example, a server, laptop computer, a desktop computer, a node of a distributed system, etc. (e.g., one or more being part of an information handling system). The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the front end devices (110), managed network devices (120), back end devices (130), and service managers (e.g., 100) described in this application and/or all, or a portion, of the methods illustrated in FIGS. 3-4. The front end devices (110), managed network devices (120), back end devices (130), and service managers (e.g., 100) may be implemented using other types of computing devices without departing from the invention. For additional details regarding computing devices, refer to FIG. 6.

While the system of FIG. 1 has been illustrated and described as including a limited number of specific components, a system in accordance with embodiments of the invention may include additional, fewer, and/or different components without departing from the invention.

Turning to FIG. 2, FIG. 2 shows a diagram of a service manager (200) in accordance with one or more embodiments of the invention. The system of FIG. 1 may include any number of service managers (e.g., 100) similar to the service manager (200) illustrated in FIG. 2. The service manager (200) may manage the service provided by the system illustrated in FIG. 1.

To manage the services provided by the system of FIG. 1, the service manager (200) may include a traffic manager (210) and storage (220). Each of these components is discussed below.

The traffic manager (210) may manage the services provided by front end devices by limiting communications within the system of FIG. 1. To do so, the traffic manager (210) may (i) obtain information regarding users of front end devices, (ii) identify the services to be provided to the users, and (iii) configure managed network devices that service the front end devices to limit the network connectivity of the front end device in a manner that limits the ability of the front end devices to only provide the identified services to the users. By doing so, the front end devices may limit the services that they provide to users of the front end devices to only those services that are to be afforded to the users (even when the front end devices are capable of providing more services).

For example, the traffic manager may request, from the front end devices, the users that are utilizing the respective front end devices (e.g., may request login information, credentials, identifiers, etc.). Once the users are identified, the traffic manager (210) may identify the services that are to be provided to the users using a provided services repository (222). The provided services repository (222) may specify the services to be provided to each user. After identifying the services to be provided to each user, the traffic manager (210) may identify network services (e.g., ports) that will be used by the front end devices to provide the services. Such information may be included in a services network use information repository (224). After identifying the relevant network services, the traffic manager (210) may reconfigure the managed network devices to limit the network services being provided to the front end devices to only those required to provide the services for the respective users.

Figure 3:
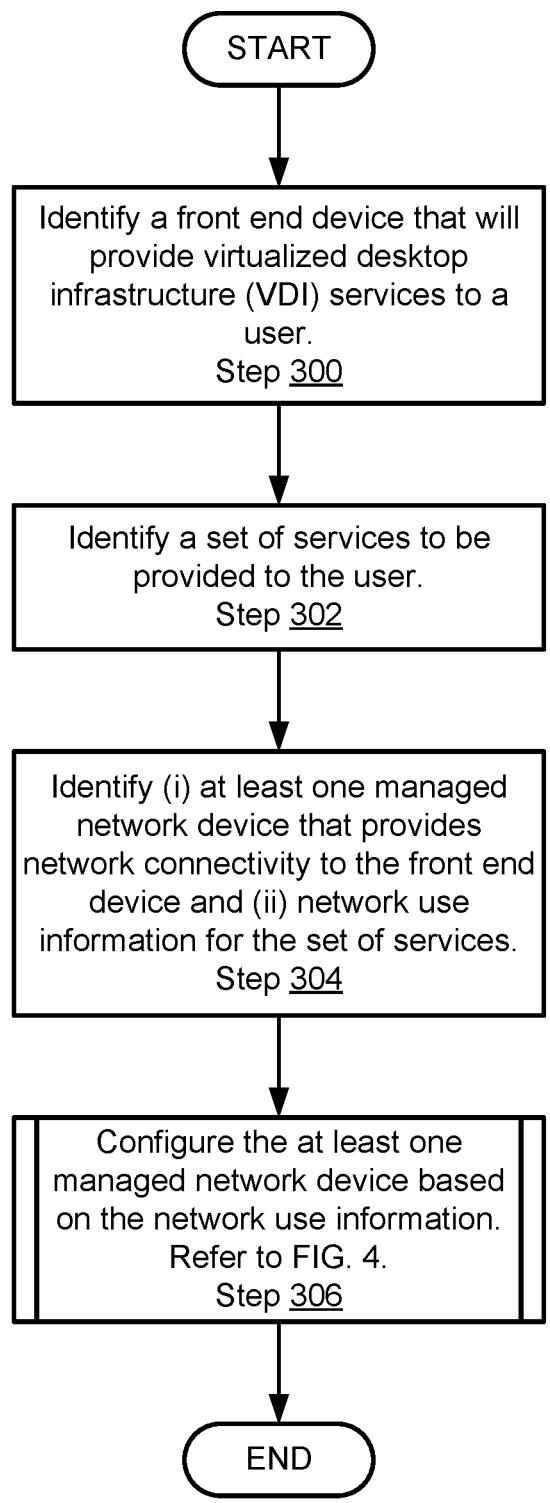
FIG. 3 shows a flowchart of a method of providing services to a user of a front end device in accordance with one or more embodiments of the invention.
Figure 4:
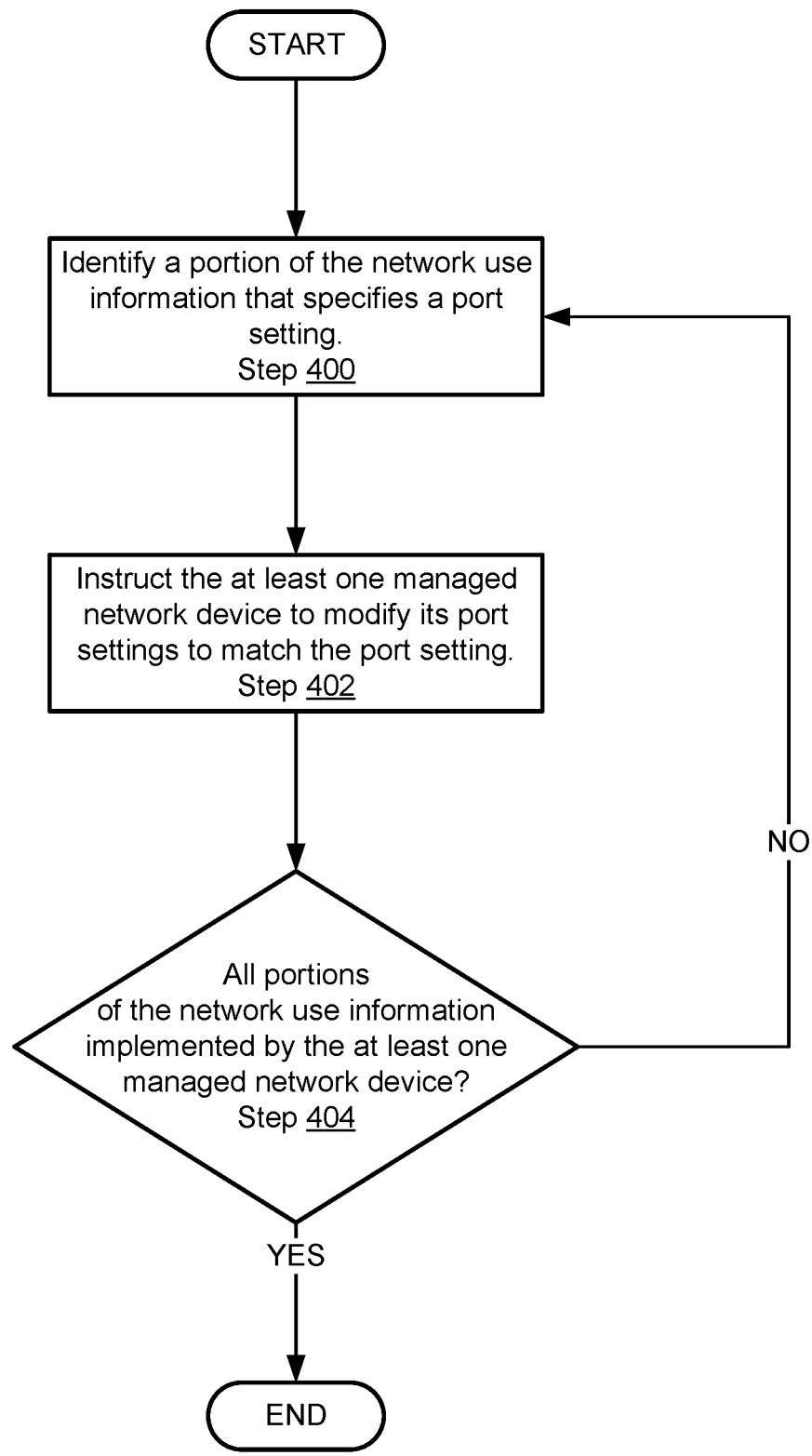
FIG. 4 shows a flowchart of a method of managing the services provided by a front end device by configuring a network environment in which the front end device resides in accordance with one or more embodiments of the invention.

When providing its functionality, the traffic manager (210) may perform all, or a portion, of the methods illustrated in FIGS. 3-4.

In one or more embodiments of the invention, the traffic manager (210) is implemented using a hardware device including circuitry. The hardware device may be, for example, a digital signal processor, a field programmable gate array, or an application specific integrated circuit. The circuitry may be adapted to cause the hardware device to perform the functionality of the traffic manager (210). The traffic manager (210) may be implemented using other types of hardware devices without departing from the invention.

In one or more embodiments of the invention, the traffic manager (210) is implemented using a processor adapted to execute computing code stored on a persistent storage that when executed by the processor performs the functionality of the traffic manager (210). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified/created) to perform the function. Computer instructions may be used to program a hardware device that, when programmed, provides the function.

In one or more embodiments disclosed herein, the storage (220) is implemented using physical devices that provide data storage services (e.g., storing data and providing copies of previously stored data). The devices that provide data storage services may include hardware devices and/or logical devices. For example, storage (220) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (220) may include a memory device (e.g., a dual in line memory device) in which data is stored and from which copies of previously stored data are provided. In another example, storage (220) may include a persistent storage device (e.g., a solid-state disk drive) in which data is stored and from which copies of previously stored data is provided. In a still further example, storage (220) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (220) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (220) may store data structures including, for example, a provided services repository (222) and a services network use information repository (224). Each of these data structures is discussed below.

The provided services repository (222) may be implemented using one or more data structures that includes information regarding the services that are to be provided to the users of the front end devices. The information may include, for example, identifiers of the users, identifiers of the services, and/or other information that may be used to determine which services are to be provided to the respective users.

The provided services repository (222) may also specify other information such as, for example, the priority of the users of the front end devices. The priority may be used to determine how to marshal limited computing resources in the system of FIG. 1 to provide services to the users of the front end devices. For example, the priority may be used to determine how quickly communications (for the purposes of providing services in cooperation with back end devices) are to be processed by the network environment.

The traffic manager (210) may use the information included in the provided services repository (222) to determine how to configure managed network devices. For example, the traffic manager (210) may use the information to identify the services that the front end devices are to provide to the respective users.

The provided services repository (222) may be maintained by, for example, the traffic manager (210). For example, the traffic manager (210) may add, remove, and/or modify information included in the provided services repository (222). The traffic manager (210) may do so based on information obtained from administrators, other data structures, and/or from other sources.

The data structures of the provided services repository (222) may be implemented using, for example, lists, tables, unstructured data, databases, etc. While illustrated in FIG. 2 as being stored locally, the provided services repository (222) may be stored remotely and may be distributed across any number of devices without departing from the invention.

The services network use information repository (224) may be implemented using one or more data structures that includes information regarding the network services (e.g., network use information) used by the front end devices to provide respective services. For example, the services network use information repository (224) may specify identifiers of services and corresponding ports (or other types of information that may be usable to configure managed network devices to enable or disable provisioning of the respective services).

The services network use information repository (224) may specify how to configure managed network devices at any level of granularity without departing from the invention. The services network use information repository (224) may specify specific settings corresponding to particular services.

For example, consider a scenario where the user is to be treated as a normal worker. In such a scenario, the network use information for the user may specify that certain ports are to be opened, other ports are to be blocked, that certain back end devices are to provide (in part) the services provided by the front end device which the user is using, and that traffic from the user is to be afforded a normal level of quality (e.g., a normal processing rate).

In contrast, a second user may be determined to be a high priority worker. In such a case, the network use information for the second user may specify that more ports are to be opened than were for the first user (e.g., to allow a front end device to provide more services to the second user), only certain backend devices that have high processing capacities are going to provide (in part) the services provided by the front end device used by the second user, and that traffic from the second user is to be afforded a high level of quality (e.g., a higher processing rate than the traffic from the normal user).

The network user information may specify any number of configurations for the network environment that cause the functionality able to be provided by front end devices to be highly configurable.

The services network use information repository (224) may be maintained by, for example, the traffic manager (210). For example, the traffic manager (210) may add, remove, and/or modify information included in the services network use information repository (224). The aforementioned information may be obtained from administrators or other sources without departing from the invention.

The data structures of the services network use information repository (224) may be implemented using, for example, lists, tables, unstructured data, databases, etc. While illustrated in FIG. 2 as being stored locally, the services network use information repository (224) may be stored remotely and may be distributed across any number of devices without departing from the invention.

While the storage (220) has been illustrated and described as including a limited quantity and type of data, a storage in accordance with embodiments of the invention may store additional, less, and/or different data without departing from the invention.

While the infrastructure manager (200) has been illustrated and described as including a limited number of specific components, an infrastructure manager in accordance with embodiments of the invention may include additional, fewer, and/or different components without departing from the invention.

As discussed above, the system of FIG. 1 may manage the services provided to users by front end devices. FIGS. 3-4 illustrate methods that may be performed by components of the system of FIG. 1 to manage the provided services.

FIG. 3 shows a flowchart of a method in accordance with one or more embodiments of the invention. The method depicted in FIG. 3 may be performed to manage services provided to users in accordance with one or more embodiments of the invention. The method shown in FIG. 3 may be performed by, for example, a service manager (e.g., 100, FIG. 1). Other components of the system in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a front end device that will provide VDI services to a user is identified. The front end device may be identified by, for example, receiving a communication from the front end devices indicating that the service manager is to manage the services provided by the front end device, receiving a communication from another entity (a management entity, administrator, etc.) indicating that the service manager is to manage the services provided by the front end device, reading an identifier of the front end device from a list of front end devices that the service manager is to manage, identifying that the front end device is unmanaged (e.g., via any command and control scheme), identifying that the front end device has been newly added, etc. The front end device may be identified via other methods.

The front end device may implement the VDI to provide services to users of the front end device using, at least in part, computing resources of other devices such as backend devices. When doing so, various functionalities of all of the computer implemented services that may be provided by the VDI may utilize different ports or may otherwise be filterable by a network environment (e.g., by matching packet sources or other identifiers included in the packets).

In step 302, a set of services to be provided to the user of the front end device may be identified.

In one or more embodiments of the invention, the set of services is identified by matching an identity of the user to services to be provided to that user. For example, an identity of a user may be used as a key for the provided services repository. The provided services may specify, using the identity of the user, the set of services.

The set of services may include any number of computer implemented services. However, the set of services may include fewer services than all of the services that the VDI hosted by the front end device may provide to a user of the front end device. Thus, the front end device may be capable (in cooperation with backend devices) of providing more services than a user of the front end device is to be afforded (e.g., based on a subscription, a resources management plan, etc.).

In step 304, both (i) at least one managed network device that provides network connectivity to the front end devices and (ii) network use information for the set of services is identified.

The at least one managed network device may be identified based on the network topology. For example, the at least one managed network device may be operably connected to the front end device and may provide the front end device with network connectivity (e.g., packet forwarding that allows the front end device to communicate with other devices such as backend devices that may be remote to the front end device).

The network topology may be identified via any discovery technique without departing from the invention. For example, the network topology may be identified by requesting such information from the front end device (e.g., to which devices it is connected), requesting such information from any number of managed network devices, from a network management controller or other device that maintains a map of the network topology (e.g., operable connections between various devices, logical overlays set on top of the operable connections, etc.), or may obtain the network topology via other methods.

The network topology may be usable to identify which managed network devices provide network connectivity to the front end device. For example, the network topology may be implemented by a list of managed network devices that provide network topology to respective front end devices.

The network use information may be identified using a services network use information repository. For example, the services of the set of services may be used as keys for the services network use information repository. The network use information may specify which network services (e.g., ports, traffic classes, etc.) are used by the set of services.

For example, the network use information may include a list of services and corresponding network services used by each service such as port identifiers, traffic class identifiers, and/or other information that may be usable to allow such network services to be provided and/or prevented for the set of services.

In step 306, the at least one managed network device is configured based on the network use information.

In one or more embodiments of the invention, the at least one managed network device is configured in a manner that only allows the set of services to be provided at predetermined quality levels. Consequently, when the at least one managed network device is configured, the corresponding front end device that relies on the network services provided by the at least one managed network device may only be able to provide the set of services at the predetermined quality levels.

The at least one managed network device may be configured by, for example, sending a communication to the at least one managed network device including the configuration, sending a request to an entity (e.g., network controller) that manages the at least one managed network device, publishing a new configuration for the at least one managed network device via a publish subscribe system and to which the at least one managed network device is subscribed, etc. The at least one managed network device may take action or otherwise cooperate in changing its configuration based on information obtained from the service manager (or other entities).

Configuring the at least one managed network device may include, for example, modifying any number of policies that it implements. These policies may specify whether ports are open or closed (e.g., to certain devices such as the front end device), rates at which traffic from the front end device will be processed (e.g., at any level of granularity), and/or other actions to be performed by the configured at least one managed network device.

The at least one managed network device may, after being configured, processes network traffic in accordance with these policies. For example, if the front end device sends traffic to the at least one managed network device via a blocked port, then the at least one managed network device may drop the traffic (i.e., packets or other communication protocol compliant data structures).

In one or more embodiments of the invention, the at least one managed network device is configured via the method illustrated in FIG. 4.

The method may end following step 306.

Using the method illustrated in FIG. 3, the services provided by a front end device to a user may be limited by configuring managed network devices that provide communication services to the front end device rather than the front end device itself. Consequently, the front end device may be hardened (e.g., made unconfigurable), may not need to be interacted with, or may otherwise be allowed to continue to operate without changing its operation directly.

Turning to FIG. 4, FIG. 4 shows a flowchart of a method in accordance with one or more embodiments of the invention. The method depicted in FIG. 4 may be performed to configure a managed network device in accordance with one or more embodiments of the invention. The method shown in FIG. 4 may be performed by, for example, a service manager (e.g., 100, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a portion of the network use information that specifies a port setting is identified. The portion of the network use information may not have already been processed for configuration purposes. For example, the service manager may sequentially read through portions of the network use information to identify various port settings (and/or other network configuration information).

In step 402, the at least one managed network device is instructed to modify its port settings to match the port setting. The at least one managed network device may be instructed by sending a communication to the managed network device that specifies the port setting.

The port setting may be, for example, to allow traffic to be forwarded via the port, to prevent traffic from being forwarded via the port, to process traffic at up to a predetermined rate via the port (e.g., a quality of service limitation), or any other type of change in the manner that the at least one network device provides communication services to a front end device.

In response to being instructed, the at least one managed network device may implement the port settings. For example, the at least one managed network device may update its firewall list (e.g., to prevent/allow traffic over ports), update its quality of service policies that define the qualities of service to be provided to various types of traffic from the front end device, etc. Once updated, the at least one managed network device may forward packets (or other communication protocol compliant data structures) from the front end device in accordance with the updates.

In step 404, it is determined whether all portions of the network use information are implemented by the at least one managed network device. In other words, it may be determined whether all of the network use information has been processed.

To make the determination, the service manager may, for example, query the at least one managed network device to identify whether it has implemented the updates by requesting various configuration information from the at least one managed network device.

If it is determined that all portions of the network use information have been implemented, then the method may end following step 404. Otherwise, the method may proceed to step 400, following step 400 to continue processing network use information.

Using the method illustrated in FIG. 4, managed network devices may be configured in a manner that causes the services provided by front end devices to match those that are to be provided to users of the front end devices and at specified quality levels. For example, by blocking certain ports and limiting the rate at which different classes of traffic are processed, the services provided to users of the front end devices may be configured without altering the operation of the front end devices.

To further clarify embodiments of the invention, a non-limiting example is provided in FIGS. 5.1-5.6. These figures show diagrams of an example of a system similar to that of FIG. 1 over time. In the figures, the sequential actions performed by the respective components are highlighted in order from 1-10 (circled in these figures) and connected one another, sequentially, using dashed lines.

EXAMPLE

Consider a scenario as illustrated in FIG. 5.1 in which a user begins to use a front end device (502) by logging into the device (e.g., being in proximity to the device and using input devices to access the front end device (502)). When the user logs into the device, the front end device (502) is able to provide a range of services in cooperation with a backend device (506) including, for example, displaying interfaces and allowing electronic communication to be transmitted.

To provide these services, the front end device (502) hosts VDI that provides these services via communications with the backend device (506) which performs the computations that allow these services to be provided to the user. The interface display services utilize a first port for communications purposes and the electronic communication services utilize a second port for communications purposes.

Turning to FIG. 5.2, at step 1, the front end device (502) sends a communication to a service manager (500) that manages the services provided to users. The communication specifies an identity of the user.

At step 2, the service manager (500) matches the identity of the user to a set of services to be afforded to the user. For example, the service manager (500) may match the user identity to one or more entries of a provided services repository (e.g., 222, FIG. 2). The entries may specify the services that are to be provided to the user. In this example, the set of services includes interface display services but does not include electronic communication services because the user is not properly credentialed for that service.

Based on the services afforded to this user, the service manager (500) identifies network use information for these services. The network use information indicates that only the front end device (502) should only be allowed to communicate with the backend device (506) via the first port and not the second port. The network use information may be identified by, for example, matching identifiers of the set of services to entries of a services network use information repository that specify the ports that are to be enabled for the set of services.

Additionally, the service manager (500) identifies that the user is a high priority user (e.g., based on the user's credentials) which affords the user with the privilege of a more responsive user experience. To provide this user experience, the service manager (500) determines that traffic from the front end device (502) should be provided with a high quality of service (e.g., high processing rate for communications purposes).

Turning to FIG. 5.3, at step 3, the service manager (500) sends a communication to a managed network device (504) that provides communications services to the front end device (502). The communication indicates that the front end device (502) should only be allowed to communicate with other devices via the first port and that these communications should be prioritized for processing over other communications (e.g., over communications from other front end devices not illustrated in FIG. 5.3.)

At step 4, the managed network device (504) updates its operation to implement the instructions included in the communication. For example, the managed network device (504) updates its firewall settings to block all communications from front end device (502) except those via the first port and updates its quality of service priorities to reflect that the communications from the front end device (502) are being prioritized.

At this point in time, the system of FIG. 5.3 has been configured in a manner that prevents the front end device (502) from providing electronic communications services without modifying the operation of the front end device (502).

Turning to FIG. 5.4, at step 5, the front end device (502) sends two communications to the managed network device (504). The first communication (e.g., related to interface functionality) is sent via the first port and the second communication (e.g., related to electronic communications) is sent via the second port.

At step 6, the managed network device (504) applies its firewall and drops the second communication because it is both from the front end device (502) and was sent via the second port. In contrast, the managed network device (504) prioritizes the first communication for processing.

Turning to FIG. 5.5, at step 7, the managed network device (504) forwards (i.e., processes) the first communication to the back end device (506) via network (510).

At step 8, in response to receiving the first communication, the backend device (506) performs computations to provide the interface functionality requested in the first communication. In contrast, because the second communication has been dropped, the backend device (506) does not perform any functionality related to electronic communications.

Turning to FIG. 5.6, at step 9, the backend device (506) sends a communication to the front end device (502) which includes information so that the front end device (502) is able to provide the interface functionality.

At step 10, the front end device (502) provides the interface functionality to the user using the information included in the communication.

End of Example

As seen in the above example, the services to users of front end devices may be managed by modifying the network environment in which the front end devices reside. For example, by modifying which ports through which the front end devices are allowed to communicate, the functionalities corresponding to the limited ports may be managed at a granular level. Similarly, modifying rulesets implemented by the front end devices may be used to manage the quality of the experience provided to the users of the front end devices. By dynamically modifying the network environment, the functionalities of the front end devices may be tailored as the various users of the front end devices change over time.

As discussed above, embodiments of the invention may be implemented using computing devices. FIG. 8 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a system and method for managing the services provided to users of front end devices. Specifically, embodiments of the invention may manage the services provided by front end devices by configuring the network environment in which the front end devices reside to limit their ability to communicate with backend devices that may provide, at least in part, some of the services. To do so, the system may limit network access in a manner that prevents the front end devices from providing some services while allowing other to be provided and at quality levels afforded to the respective users of the front end devices. By doing so, the system may manage the services provided by front end devices in a manner that does not require reconfiguration of the front end devices and at a highly granular level (e.g., even beyond that which may be possible via configuration of the front end devices).

Thus, embodiments of the invention may address the problem of service management in a dynamic, distributed computing environment. For example, as front end devices provide services to different users over time, the services provided to each of the respective users by the front end devices may be modified by changing the network environment (e.g., allowing, limiting, controlling the quality of communications) in which the front end devices reside.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A service manager for managing services made available to front end devices operably connected to back end devices via managed network devices, comprising:

a storage device for storing a services network use information repository that associates the services with network functions enabled by the managed network devices; and a processor programmed to:

make an identification of a front end device of the front end devices that will provide virtualized desktop infrastructure (VDI) services, using at least one of the back end devices, to a first user;

in response to the identification:

identify a set of services to be provided to the first user from a provided services repository (PSR) based on at least an identifier of the first user and identifiers of the set of services, wherein the identifier of the first user is used as a key for the PSR in order to match the identifier of the first user to the set of services;

identify:

at least one of the managed network devices that provides network connectivity to the front end device based on a network topology, wherein the network topology is identified using a discovery model, and network use information for the set of services using the services network use information repository, wherein the network use information specifies, in part, a priority level of the first user with respect to at least a second user, wherein the priority level is used to identify and prioritize the set of services to be provided to the first user; and configure the at least one managed network device to enable the front end device to provide a first service of the set of services to the first user only at a predetermined quality level based on the network use information, wherein the front end device provides the first service and a second service to the second user.

2. The service manager of claim 1, wherein each of the VDIs provides the services using corresponding ports managed by the managed network devices.

3. The service manager of claim 2, wherein configuring the at least one managed network device comprises:
blocking at least one of the corresponding ports.

4. The service manager of claim 3, wherein the set of services does not include one of the services that uses the at least one of the corresponding ports.

5. The service manager of claim 3, wherein blocking the at least one of the corresponding ports prevents the front end device from communicating with the back end devices for the purpose of providing one of the services while the VDI is capable of providing the one of the services when able to communicate with the back end devices for that purpose.

6. The service manager of claim 2, wherein configuring the at least one managed network device further comprises:
enabling all of the ports utilized by the set of services.

7. The service manager of claim 1, wherein the network use information comprises a list of ports which the set of services uses at least one to communicate with the back end devices while providing one or more of the set of services.

8. The service manager of claim 7, wherein the at least one managed network device is a router that forwards communications between the front end device and the back end devices using the ports.

9. The service manager of claim 8, wherein configuring the at least one managed network device comprises blocking a first portion of the ports that is not used to provide the set of services and enabling a second portion of the ports that is used to provide the set of services.

10. The service manager of claim 1, wherein configuring the at least one managed network device comprises modulating a rate of traffic associated with the first user that the at least one managed network device will process.

11. The service manager of claim 10, wherein the rate of traffic associated with the first user is modulated based on the priority level.

12. A method for managing services made available to front end devices operably connected to back end devices via managed network devices, comprising:
making an identification of a front end device of the front end devices that will provide virtualized desktop infrastructure (VDI) services, using at least one of the back end devices, to a first user;
in response to the identification:
identifying a set of services to be provided to the first user from a provided services repository (PSR) based on at least an identifier of the first user and identifiers of the set of services, wherein the identifier of the first user is used as a key for the PSR in order to match the identifier of the first user to the set of services;
identifying:
at least one of the managed network devices that provides network connectivity to the front end device based on a network topology, wherein the network topology is identified using a discovery model, and
network use information for the set of services using a services network use information repository that associates the services with network functions enabled by the managed network devices, wherein the network use information specifies, in part, a priority level of the first user with respect to at least a second user, wherein the priority level is used to identify and prioritize the set of services to be provided to the first user; and
configuring the at least one managed network device to enable the front end device to provide a first service of the set of services to the first user only at a predetermined quality level based on the network use information, wherein the front end device provides the first service and a second service to the second user.

13. The method of claim 12, wherein each of the VDIs provides the services using corresponding ports managed by the managed network devices.

14. The method of claim 13, wherein configuring the at least one managed network device comprises:
blocking at least one of the corresponding ports.

15. The method of claim 14, wherein the set of services does not include one of the services that uses the at least one of the corresponding ports.

16. A non-transitory computer readable medium comprising computer readable program code, which when executed by a computer processor enables the computer processor to perform a method for managing services made available to front end devices operably connected to back end devices via managed network devices, the method comprising:
making an identification of a front end device of the front end devices that will provide virtualized desktop infrastructure (VDI) services, using at least one of the back end devices, to a first user;
in response to the identification:
identifying a set of services to be provided to the first user from a provided services repository (PSR) based on at least an identifier of the first user and identifiers of the set of services, wherein the identifier of the first user is used as a key for the PSR in order to match the identifier of the first user to the set of services;
identifying:
at least one of the managed network devices that provides network connectivity to the front end device based on a network topology, wherein the network topology is identified using a discovery model, and
network use information for the set of services using a services network use information repository that associates the services with network functions enabled by the managed network devices, wherein the network use information specifies, in part, a priority level of the first user with respect to at least a second user, wherein the priority level is used to identify and prioritize the set of services to be provided to the first user; and
configuring the at least one managed network device to enable the front end device to provide a first service of the set of services to the first user only at a predetermined quality level based on the network use information, wherein the front end device provides the first service and a second service to the second user.

17. The non-transitory computer readable medium of claim 16, wherein each of the VDIs provides the services using corresponding ports managed by the managed network devices.

18. The non-transitory computer readable medium of claim 17, wherein configuring the at least one managed network device comprises:
blocking at least one of the corresponding ports.

19. The non-transitory computer readable medium of claim 18, wherein the set of services does not include one of the services that uses the at least one of the corresponding ports.

* * * * *